(12) United States Patent
Shimoi et al.

(10) Patent No.: US 6,572,726 B2
(45) Date of Patent: Jun. 3, 2003

(54) PROCESS FOR PRODUCING FRICTION PLATE HAVING FLAT FRICTION SURFACE AND SYSTEM FOR PRODUCING THE SAME

(75) Inventors: Hiroji Shimoi, Shizuoka (JP); Kenichi Toba, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 119 days.

(21) Appl. No.: 09/919,592

(22) Filed: Aug. 1, 2001

(65) Prior Publication Data

US 2002/0023701 A1 Feb. 28, 2002

(30) Foreign Application Priority Data

Aug. 2, 2000 (JP) ........................................ 2000-238855

(51) Int. Cl.$^7$ .......................... B32B 31/00; B32B 35/00; F16D 13/58
(52) U.S. Cl. ....................... 156/265; 156/258; 156/269; 156/299; 156/304.1; 156/512; 156/517; 156/521; 156/560; 29/412; 29/417; 188/18 A; 188/218 XL
(58) Field of Search .................................. 156/258, 265, 156/269, 299, 300, 304.1, 512, 521, 516, 517, 560; 29/417, 412; 188/18 A, 218 XL

(56) References Cited

U.S. PATENT DOCUMENTS 6,500,294 B1 * 12/2002 Honda et al. ............... 156/265

* cited by examiner

*Primary Examiner*—Linda Gray
(74) *Attorney, Agent, or Firm*—Arent Fox Kintner Plotkin & Kahn, PLLC

(57) ABSTRACT

A process for producing a friction plate having a flat friction surface includes a step of provisionally arranging a plurality of sector-shaped lining segments punched out of a friction lining tape material, in a generally annular form on an index table so as not to overlap with each other, a step of correcting the provisional arrangement of the lining segments into an annular form having no gaps between the lining segments by moving together the plurality of lining segments, provisionally arranged on the index table, towards the centre of the index table and a step of adhering the plurality of lining segments, correctly arranged in the annular form, to a surface of a core plate. A friction plate having a flat friction surface can thereby be obtained with low cost.

7 Claims, 12 Drawing Sheets

PROCESS FOR PRODUCING FRICTION PLATE HAVING FLAT FRICTION SURFACE AND SYSTEM FOR PRODUCING THE SAME

BACKGROUND OF THE INVENTION

1. Field of the Invention

The present invention relates to a process for producing friction plates having a flat friction surface that are used as, for example, friction plates for lock-up clutches of torque converters, and a system for producing the same.

2. Description of the Related Art

The lock-up clutch of a torque converter is controlled so as to be in an ON state in its coupling region to directly connect a pump impeller to a turbine impeller, thereby eliminating any slip between the two impellers and thus improving the transmission efficiency. Such a lock-up clutch is known as disclosed in, for example, Japanese Patent Application Laid-open No. 5-71610. The ON state of the lock-up clutch is established as follows: the inner chamber of a lock-up clutch chamber is connected to a hydraulic oil supply side and the outer chamber is connected to a low pressure side, thereby increasing the pressure of the inner chamber relative to the pressure of the outer chamber; and the resulting pressure difference presses the friction plate towards the inner wall of a side cover, thereby frictionally engaging the friction lining with the inner wall.

In this case, the annular friction lining of the friction plate has a flat friction surface without oil groove, unlike the clutch friction plate having an oil groove on its friction surface that is used in a wet type multiple plate clutch for a normal transmission system. It is therefore possible to prevent the hydraulic pressure of the inner chamber from leaking into the outer chamber through a gap between the friction lining and the side cover, whereby a good clutch ON state can be maintained.

Conventionally, the entire annular friction lining having a flat friction surface is formed as a single lining having no seams is punched out of friction lining tape material. However, the production of such friction linings generates a large amount of lining material scrap, leading to a very poor yield which is a large barrier to reducing the cost of friction plates.

SUMMARY OF THE INVENTION

The present invention has been carried out in view of the above-mentioned circumstances, and it is an object of the present invention to provide a process for producing friction plates having a flat friction surface with low cost by forming an annular friction lining from lining segments that are punched out of friction lining tape material with good yield. Furthermore, it is another object of the present invention to provide a system for producing such friction plates.

In order to achieve the above-mentioned objects, in accordance with a first characteristic of the present invention, there is proposed a process for producing a friction plate having a flat friction surface by adhering an annular friction lining having a flat friction surface to a side of a core plate. The process comprises steps of provisionally arranging a plurality of sector-shaped lining segments, punched out of a friction lining tape material, in a generally annular form on an index table so as not to overlap with each other; correcting the provisional arrangement of the lining segments into an annular form having no gaps between the lining segments by moving together the plurality of lining segments, provisionally arranged on the index table, towards the centre of the index table, and adhering the plurality of lining segments, correctly arranged in the annular form, to the side of the core plate.

In accordance with the above-mentioned arrangement, the plurality of sector-shaped lining segments can be punched out of the friction lining tape material with good yield; by forming an annular friction lining having a flat friction surface from these lining segments and adhering the lining to the side of the core plate, a friction plate having a flat friction surface can be produced efficiently, thereby contributing to a reduction in the cost of the friction plate.

Furthermore, in accordance with a second characteristic of the present invention, in addition to the above-mentioned first characteristic, there is proposed a process for producing a friction plate having a flat friction surface wherein in the step of provisionally arranging the plurality of lining segments on the index table each of the lining segments punched out of the friction lining tape material is placed in turn on the index table that is rotating.

In accordance with the above-mentioned arrangement, the plurality of lining segments can be provisionally arranged on the index table with good efficiency.

Furthermore, in accordance with a third characteristic of the present invention, in addition to the above-mentioned first characteristic, there is proposed a process for producing a friction plate having a flat friction surface further comprising steps of transferring the group of lining segments correctly arranged on the index table from the index table to the side of the core plate that has been coated with an adhesive and carrying out provisional adhesion, and actually adhering the group of provisionally adhered lining segments to the core plate by compressing/heating.

In accordance with the above-mentioned arrangement, the arrangement of the group of lining segments can be checked before actual adhesion to re-correct the arrangement thus contributing to an improvement in quality.

Furthermore, in accordance with a fourth characteristic of the present invention, there is proposed a system for producing a friction plate having a flat friction surface by adhering an annular friction lining having a flat friction surface to a side of a core plate, comprising a lining segment provisional arrangement station in which a plurality of sector-shaped lining segments, punched out of a friction lining tape material, are provisionally arranged in a generally annular form on an index table so as not to overlap with each other; a lining segment arrangement correction station in which the provisional arrangement of the lining segments is corrected into an annular form having no gaps between the lining segments by moving together the plurality of lining segments, provisionally arranged on the index table, towards the centre of the index table by means of a plurality of arrangement correction members provided along the outer peripheries of the lining segments, the group of correctly arranged lining segments being retained by the arrangement correction members; a lining segment provisional adhesion station in which the group of lining segments retained by the arrangement correction members is placed on a side of the core plate that has been coated with an adhesive, thereby carrying out provisional adhesion; and a lining segment actual adhesion station in which the group of provisionally adhered lining segments is pressed against the core plate by a compressing/heating plate.

In accordance with the above-mentioned arrangement, the plurality of sector-shaped lining segments can be obtained from the friction lining tape material with good yield and a friction plate having a flat friction surface can be produced efficiently using these segments, thereby contributing to a reduction in the cost of the friction plate.

Furthermore, in accordance with a fifth characteristic of the present invention, in addition to the above-mentioned fourth characteristic, there is proposed a system for producing a friction plate having a flat friction surface wherein the index table of the lining segment provisional arrangement station has a large number of vacuum holes for retaining by vacuum pressure the provisionally arranged lining segments.

In accordance with the above-mentioned arrangement, the lining segments can be provisionally arranged on the index table reliably, and it is possible to prevent each of the lining segments from displacing.

Furthermore, in accordance with a sixth characteristic of the present invention, in addition to the above-mentioned fourth characteristic, there is proposed a system for producing a friction plate having a flat friction surface wherein the arrangement correction members of the lining segment arrangement correction station have a large number of vacuum holes for retaining by vacuum pressure the group of correctly arranged lining segments.

In accordance with the above-mentioned arrangement, the group of correctly arranged lining segments can be retained by the arrangement correction members easily and reliably and it is thus possible to prevent each of the lining segments from displacing.

Furthermore, in accordance with a seventh characteristic of the present invention, in addition to the above-mentioned fourth characteristic, there is proposed a system for producing a friction plate having a flat friction surface wherein the lining segment arrangement correction station includes a cam mechanism for synchronously sliding the plurality of arrangement correction members in a radial direction.

In accordance with the above-mentioned arrangement, the plurality of arrangement correction members can be moved together, and arrangement of all the lining segments can be corrected rapidly.

DESCRIPTION OF PREFERRED EMBODIMENTS

One embodiment of the present invention is explained below by reference to the appended drawings.

Firstly, a torque converter 3 having a lock-up clutch including a friction plate F produced in accordance with the present invention is explained by reference to FIGS. 1 and 2.

Figure 1:
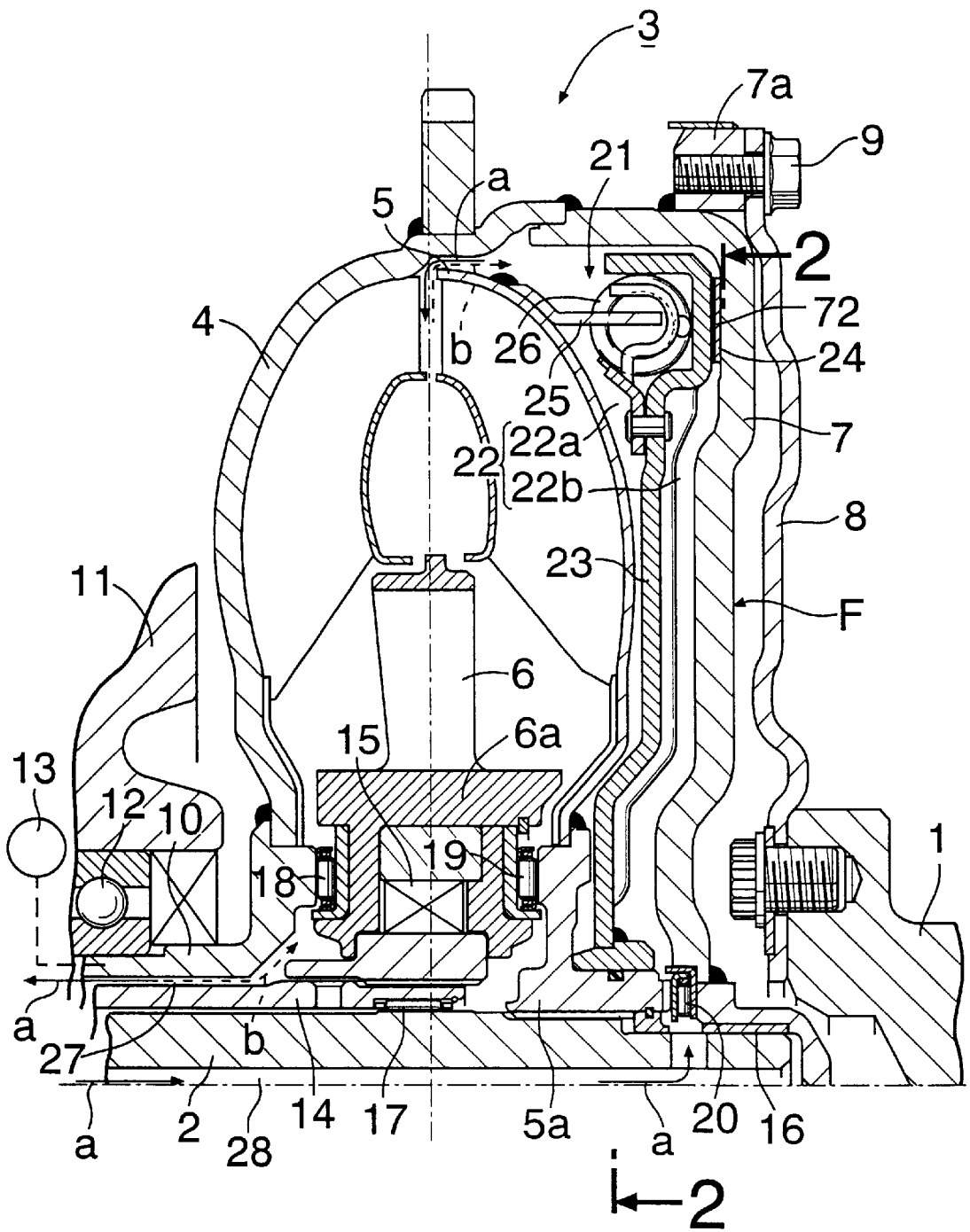
FIG. 1 is a longitudinal section of a torque converter having a lock-up clutch including a friction plate produced in accordance with the present invention.
Figure 2:
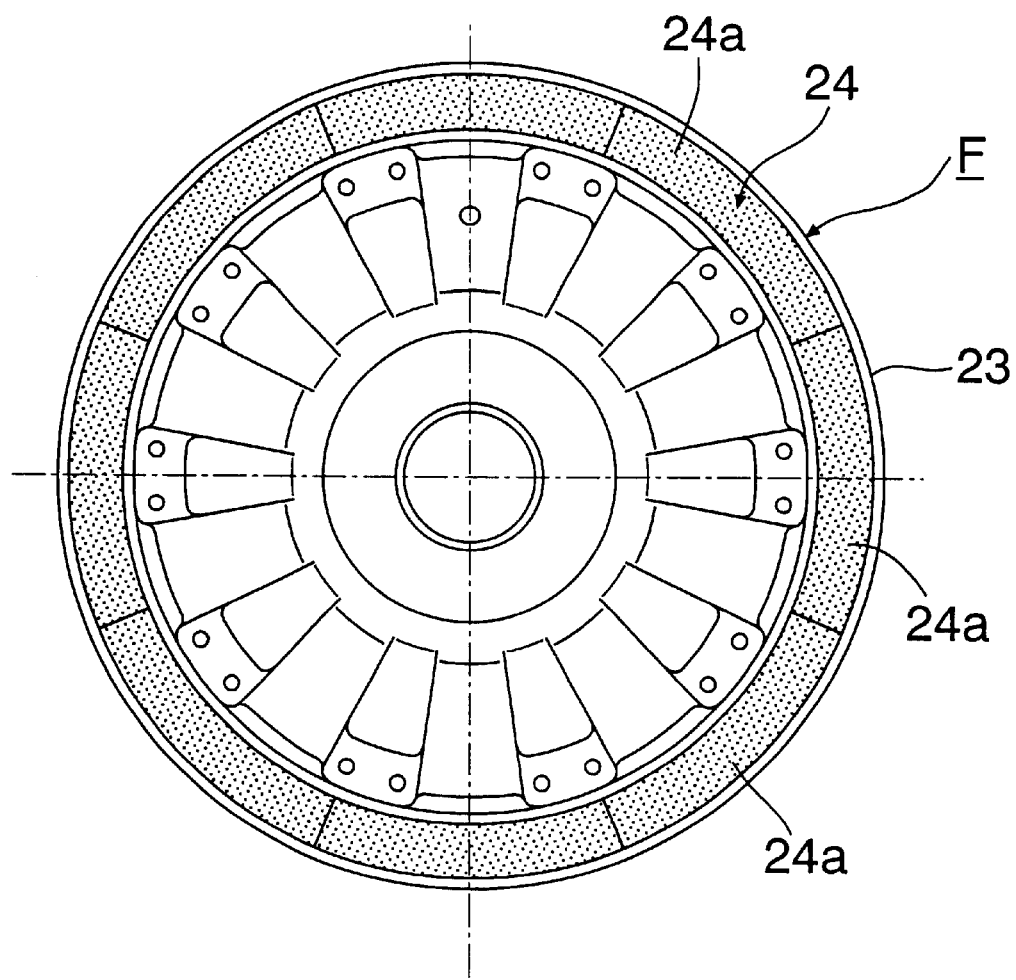
FIG. 2 is a front view of the above-mentioned friction plate (view from the arrow 2 in FIG. 1).

In FIG. 1 the torque converter 3 is placed between a crankshaft 1 of an automobile engine and an input shaft 2 of a multistage transmission. This torque converter 3 comprises a pump impeller 4, a turbine impeller 5 positioned so as to face the pump impeller 4, and a stator impeller 6 positioned in a space between these two impellers 4 and 5. The pump impeller 4 is formed integrally with a side cover 7 covering the back of the turbine impeller 5. This side cover 7 has a connecting ring 7a on the outer periphery thereof, and a drive plate 8 fixed to the output end of the crankshaft 1 is joined to the connecting ring 7a by bolts 9.

A tubiform pump shaft 10 connected to the centre of the pump impeller 4 is rotatably supported in a transmission case 11 via a bearing 12, and linked to an oil pump 13 so as to drive the pump 13. A tubiform stator shaft 14 linked to the stator impeller 6 via a flywheel 15 is provided inside the pump shaft 10.

Furthermore, the above-mentioned input shaft 2 is provided inside the stator shaft 14. This input shaft 2 is spline-connected to a boss 5a of the turbine impeller 5, and supported in both the side cover 7 and the stator shaft 14 via a bush 16 and a bearing 17 in a relatively rotatable manner.

A thrust bearing 18 is provided between the inner end of the pump shaft 10 and a boss 6a of the stator impeller 6, a thrust bearing 19 is provided between the boss 6a of the stator impeller 6 and the boss 5a of the turbine impeller 5, and a thrust bearing 20 is provided between the boss 5a of the turbine impeller 5 and the side cover 7.

A lock-up clutch 21 is formed between the turbine impeller 5 and the side cover 7. The lock-up clutch 21 can directly couple the turbine impeller 5 to the side cover 7. The lock-up clutch 21 comprises a lock-up clutch chamber 22 which is formed between the back of the turbine impeller 5 and the inside wall of the side cover 7 and which communicates with an oil chamber that is formed between the pump impeller 4 and the turbine impeller 5, and a friction plate F placed in the lock-up clutch chamber 22 so as to divide the lock-up clutch chamber 22 into an inner chamber 22a on the turbine impeller 5 side and an outer chamber 22b on the side cover 7 side. The friction plate F comprises a core plate 23 and a friction lining 24 adhered, via an adhesive 72, to the side of the core plate 23 that faces the inside wall of the side cover 7. The friction lining 24 is formed as shown in FIG. 2 by arranging a plurality of sector-shaped lining segments 24a in an annular manner without gaps.

The friction plate F is linked, via a torque damper spring 26, to a plurality of transmission claws 25 provided so as to project out of the back of the turbine impeller 5, and slidably supported on the outer periphery of the boss 5a of the turbine impeller 5 so that the friction plate F can move in the axial direction between an ON position in which the friction lining 24 is pressed against the inside wall of the side cover 7, and an OFF position in which the friction lining 24 is parted from the inside wall.

A tubiform first oil passage 27 that communicates with the oil chamber between the pump impeller 4 and the turbine impeller 5 is formed between the pump shaft 10 and the stator shaft 14. A second oil passage 28 is formed in the input shaft 2. The passage 28 runs through the centre of the shaft 2 and communicates with the outer chamber 22b.

When the torque converter 3 is in a torque conversion range, the discharge side of an oil pump 13 is connected to the second oil passage 28 by a lock-up control valve (not illustrated), and the first oil passage 27 is connected to a low pressure section such as an oil cooler. The hydraulic oil discharged from the oil pump 13 thus flows in the direction shown by arrows 'a' in FIG. 1. That is to say, the hydraulic oil flows into the lock-up clutch chamber 22 through the second oil passage 28, further flows from the outer chamber 22b to the inner chamber 22a, moves to the oil chamber between the pump impeller 4 and the turbine impeller 5, and flows out into the first oil passage 27 after filling the oil chamber. As a result, with regard to the lock-up clutch chamber 22, the pressure of the outer chamber 22b is therefore higher than that of the inner chamber 22a. This pressure difference detaches the friction plate F from the inside wall of the side cover 7. The lock-up clutch 21 thus attains an OFF state, thereby allowing the pump impeller 4 and the turbine impeller 5 to rotate relative to each other.

When the torque converter 3 enters a coupling range, this time the discharge side of the oil pump 13 is connected to the first oil passage 27 by switch over of the lock-up control valve, and the second oil passage 28 is connected to the low pressure section. The hydraulic oil discharged from the oil pump 13 therefore flows in the direction shown by arrows 'b' in FIG. 1. That is to say, the hydraulic oil flows from the first oil passage 27 into the oil chamber between the pump impeller 4 and the turbine impeller 5, and moves into the inner chamber 22a of the lock-up clutch chamber 22 after filling the oil chamber. As a result, with regard to the lock-up clutch chamber 22, the pressure of the inner chamber 22a becomes higher than that of the outer chamber 22b. This pressure difference pushes the friction plate F towards the side cover 7 to press the friction lining 24 against the inside wall of the side cover 7, thereby achieving frictional engagement. The lock-up clutch 21 thus attains an ON state, and the pump impeller 4 and the turbine impeller 5 are directly coupled to each other; that is to say, by suppressing the slip between the two impellers 4 and 5 the transmission efficiency between the crankshaft 1 and the input shaft 2 can be improved.

The annular friction lining 24 comprises a plurality of sector-shaped lining segments 24a. By neatly punching these segments 24a out of a friction lining tape material 38, the yield can be improved to a large extent and the cost can be greatly reduced.

The ends of adjacent lining segments 24a are adhered to each other by an adhesive without any gap, and the surfaces of all the lining segments 24a form a single plane. It is therefore possible to prevent the hydraulic pressure in the ON state of the lock-up clutch 21 from leaking from the inner chamber 22a to the outer chamber 22b through gaps between adjacent lining segments 24a, and desirably ensure the ON state by maintaining a large pressure difference between the two chambers 22a and 22b. The lock-up clutch 21 having the friction lining 24 is not inferior to conventional lock-up clutches having a seamless friction lining.

The process for the production of the above-mentioned friction plate F and the system for the production thereof are now explained by reference to FIGS. 3 to 11.

Figure 3:
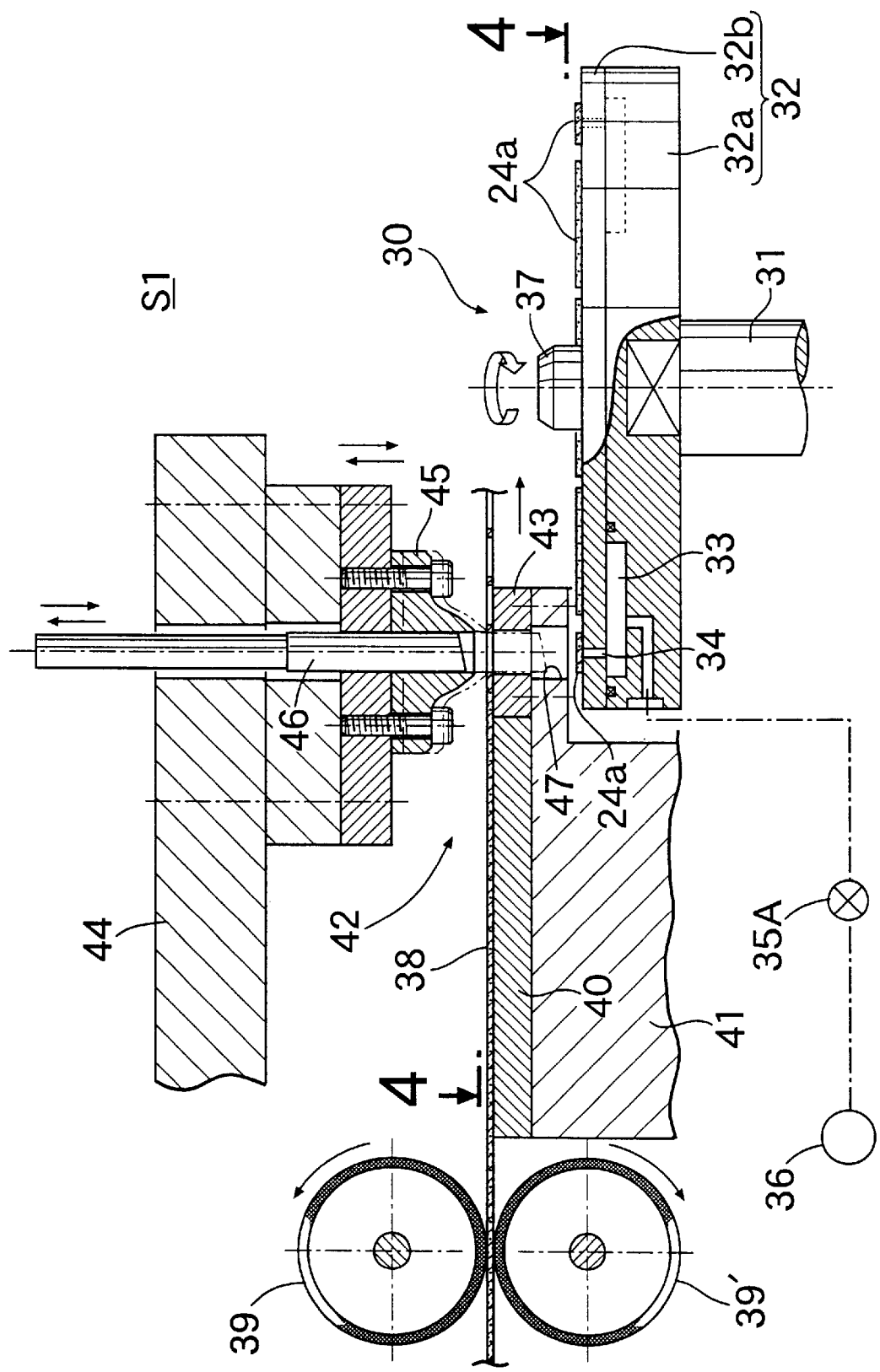
FIG. 3 is a longitudinal side view of a lining segment provisional arrangement station in a system for the production of the above-mentioned friction plate.
Figure 4:
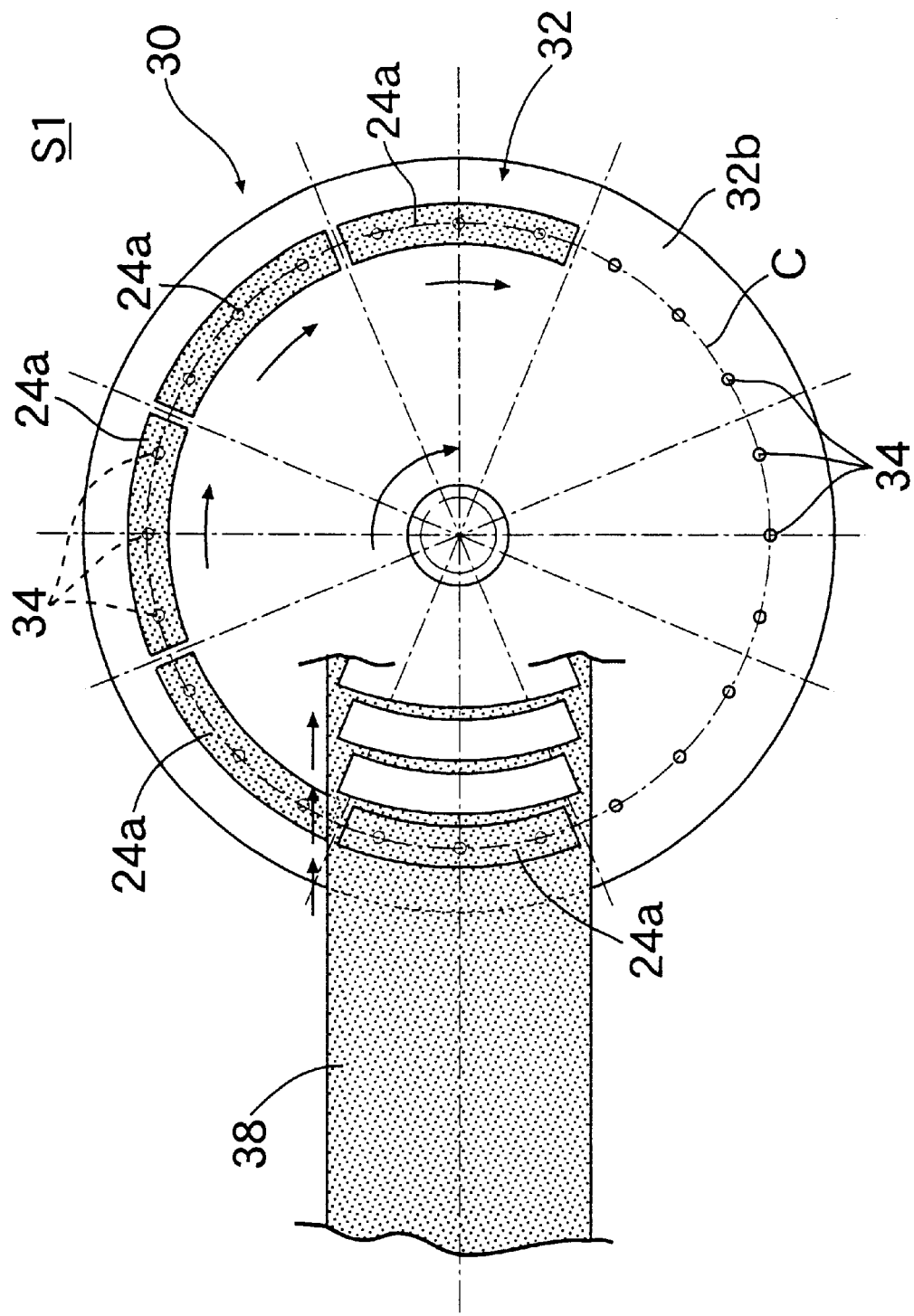
FIG. 4 is a cross-section at line 4–4 in FIG. 3.

Firstly, in FIGS. 3 and 4, a lining segment provisional arrangement device 30 is installed in a lining segment provisional arrangement station S1. This lining segment provisional arrangement device 30 includes a disc shaped index table 32 intermittently driven by a rotating shaft 31. This index table 32 comprises a table main body 32a connected to the rotating shaft 31 and a faceplate 32b joined to the top of the table main body 32a. An annular vacuum chamber 33 is formed between these joining surfaces. A large number of vacuum holes 34 communicating with the vacuum chamber 33 are provided in the faceplate 32b so as to open along a predetermined lining segment arrangement circle C on the top of the faceplate 32b. A vacuum pump 36 is connected to the vacuum chamber 33 via a first vacuum control valve 35A. A vacuum pressure is supplied to the vacuum chamber 33 from the vacuum pump 36 when the first vacuum control valve 35A is opened. The vacuum pressure of the vacuum chamber 33 is released when the first vacuum control valve 35A is closed. The faceplate 32b has a positioning projection 37 at the centre of the top thereof.

Provided on one side of the faceplate 32b are a pair of upper and lower feed rolls 39 and 39' for feeding out a friction lining tape material 38, and a material guide plate 40 for guiding the friction lining tape material 38 fed by the feed rolls 39 and 39' onto the faceplate 32b. The material guide plate 40 is supported by a support platform 41.

A lining segment punching device 42 is placed at the terminus of the material guide plate 40 so as to face a fixed position of the lining segment arrangement circle C.

The lining segment punching device 42 comprises a die 43 supported on the support platform 41 so as to adjoin the terminus of the material guide plate 40, a material presser foot 45 mounted on a vertically movable plate 44 driven by a lifting device (not illustrated) and positioned so as to face the die 43, and a punch 46 slidably fitted in an inner hole of the material presser foot 45 and connected to a lifting device (not illustrated). The blades of the above-mentioned die 43 and punch 46 have a shape corresponding to the above-mentioned lining segments 24a. A guide hole 47 guiding the punched-out material falling from the die 43 onto the index table 32 is provided in the support platform 41 beneath the die 43.

While the vacuum chamber 33 is evacuated by opening the first vacuum control valve 35A, when the friction lining tape material 38 is carried onto the die 43 by the feed rolls 39 and 39', the material presser foot 45 is lowered so as to hold the friction lining tape material 38 on the die 43, and a lining segment 24a is then punched out of the friction lining tape material 38 by working together the descending punch 46 and the die 43. The lining segment 24a falls down the guide hole 47 of the support platform 41 onto the lining segment arrangement circle C on the index table 32. Since there are a large number of the vacuum holes 34 opening on the top of the index table 32 along the lining segment arrangement circle C, the lining segment 24a is attached to a predetermined position on the index table 32 by the action of the vacuum pressure transmitted from the vacuum chamber 33 to the vacuum holes 34.

Next, both the punch 46 and the material presser foot 45 are lifted to their original positions and the rotating shaft 31 rotates the index table 32 by a portion corresponding to only one lining segment 24a. Another lining segment 24a of a new section of the friction lining tape material 38 that is carried onto the die 43 by the feed rolls 39 and 39' is punched out in the same manner as above and attached to a predetermined position on the index table 32. Subsequently, the same operation is repeated to provisionally arrange a predetermined number of lining segments 24a on the index table 32 in a generally annular manner. In this stage, the positions on the index table 32 at which the lining segments 24a fall from the die 43 are set so that the lining segments 24a are arranged with small gaps between them and without overlapping each other.

The yield can thus be improved by neatly punching the sector-shaped lining segments 24a out of the friction lining tape material 38, thereby greatly contributing to a reduction in the cost. The large number of vacuum holes 34 opening onto the top of the index table 32 can provisionally arrange the lining segments 24a on the index table 32 with precision and prevent each of the lining segments 24a from displacing.

Figure 5:
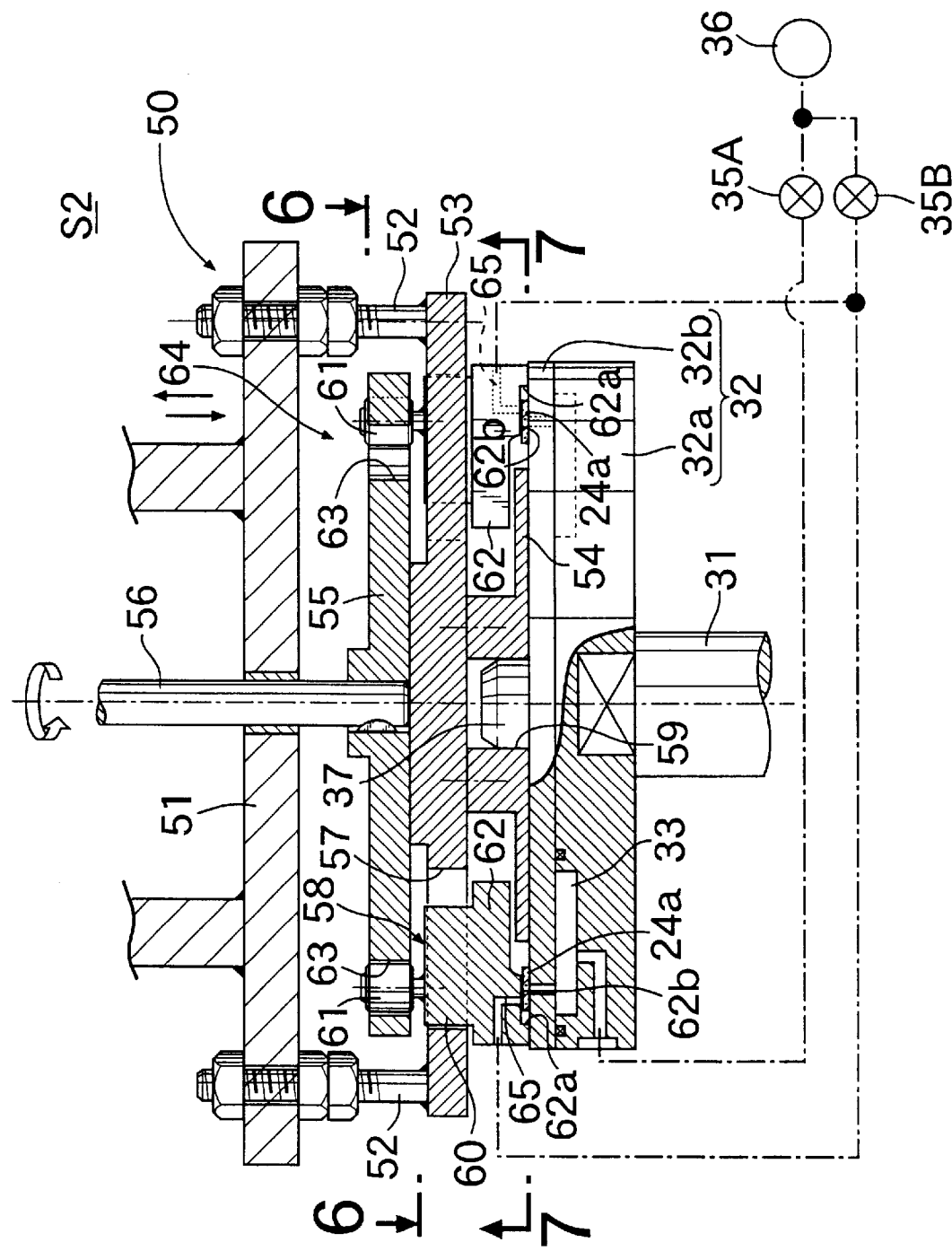
FIG. 5 is a longitudinal side view of a lining segment arrangement correction station.
Figure 6:
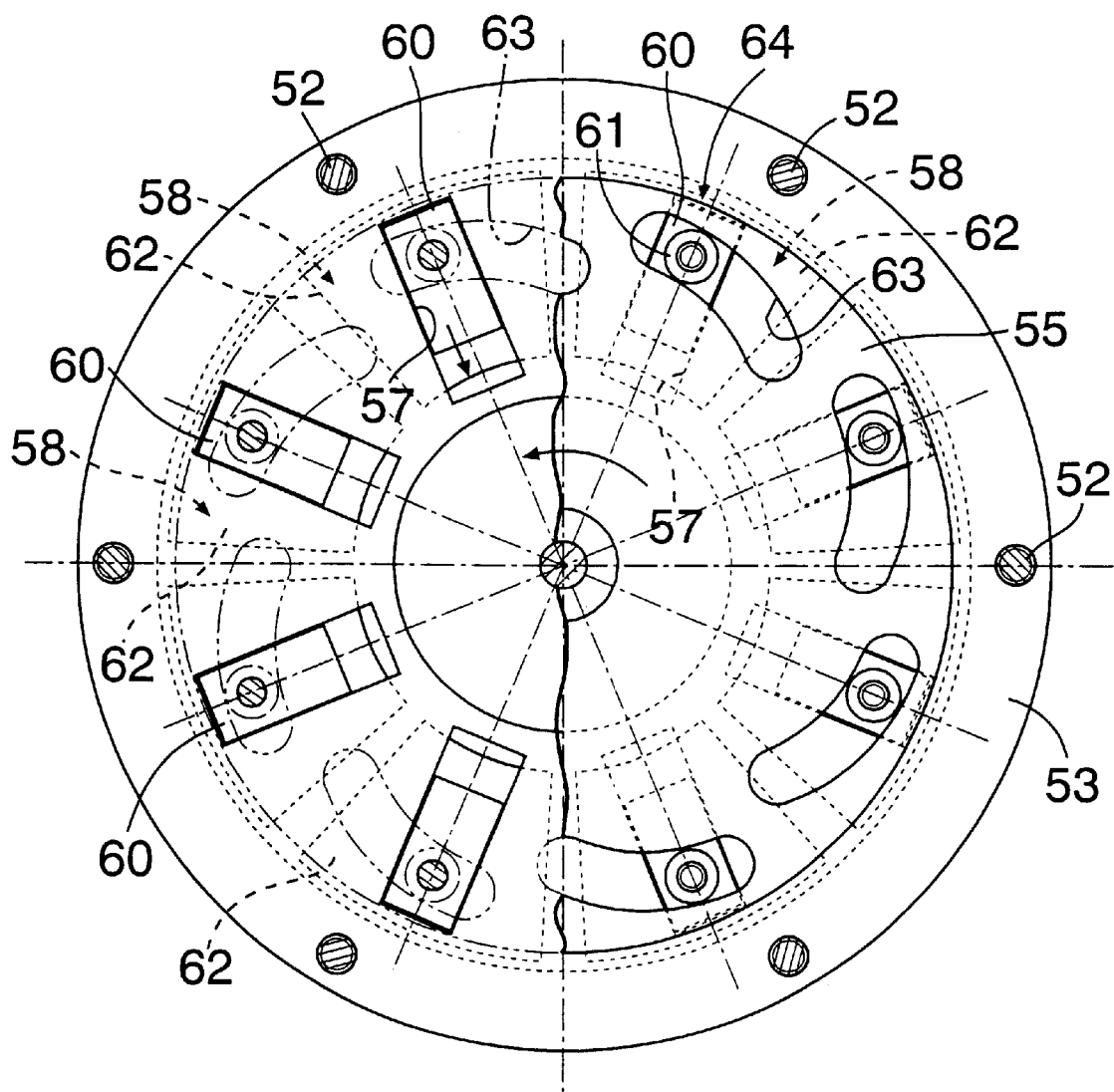
FIG. 6 is a cross-section at line 6–6 in FIG. 5.
Figure 7:
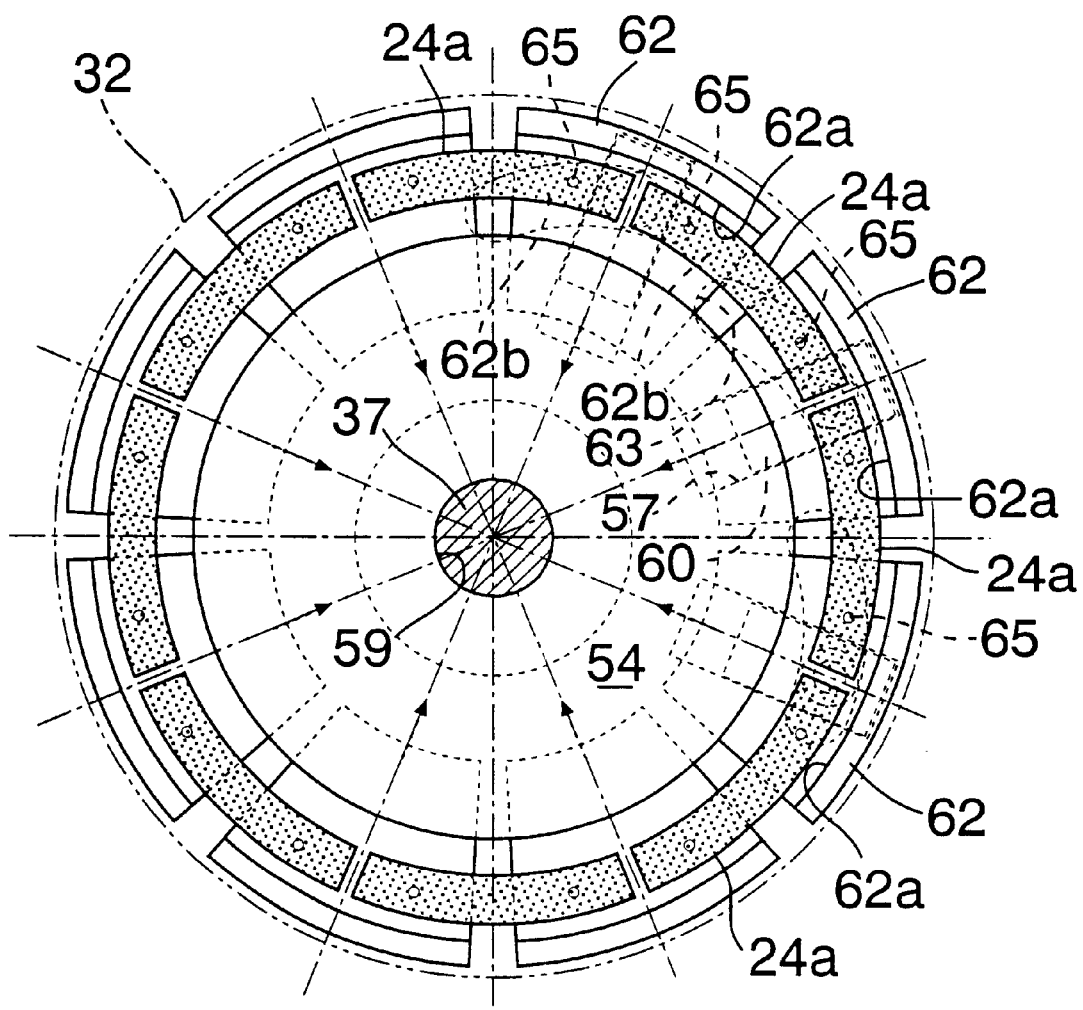
FIG. 7 is a cross-section at line 7–7 in FIG. 5.

Next, the above-mentioned index table 32 is transferred to a lining segment arrangement correction station S2 shown in FIGS. 5 to 7, with a group of the provisionally arranged lining segments 24a attached thererto by the vacuum pressure.

A lining segment arrangement correction device 50 installed in the lining segment arrangement correction station S2 comprises a lift plate 51, a device main body 53 connected to the lift plate 51 via connecting rods 52, a disc-shaped core 54 joined to the undersurface of the device main body 53, a single cam plate 55 disposed on the top of the device main body 53 in a relatively rotatable manner, and a rotating shaft 56 linked to the cam plate 55 and reciprocating the cam plate 55 through a predetermined angle. The device main body 53 has a large number of guide holes 57 arranged in a radial manner. A large number of arrangement correction members 58 are fitted in the above-mentioned guide holes 57 in a radially slidable manner. A positioning hole 59 is provided at the centre of the core 54.

Figure 8:
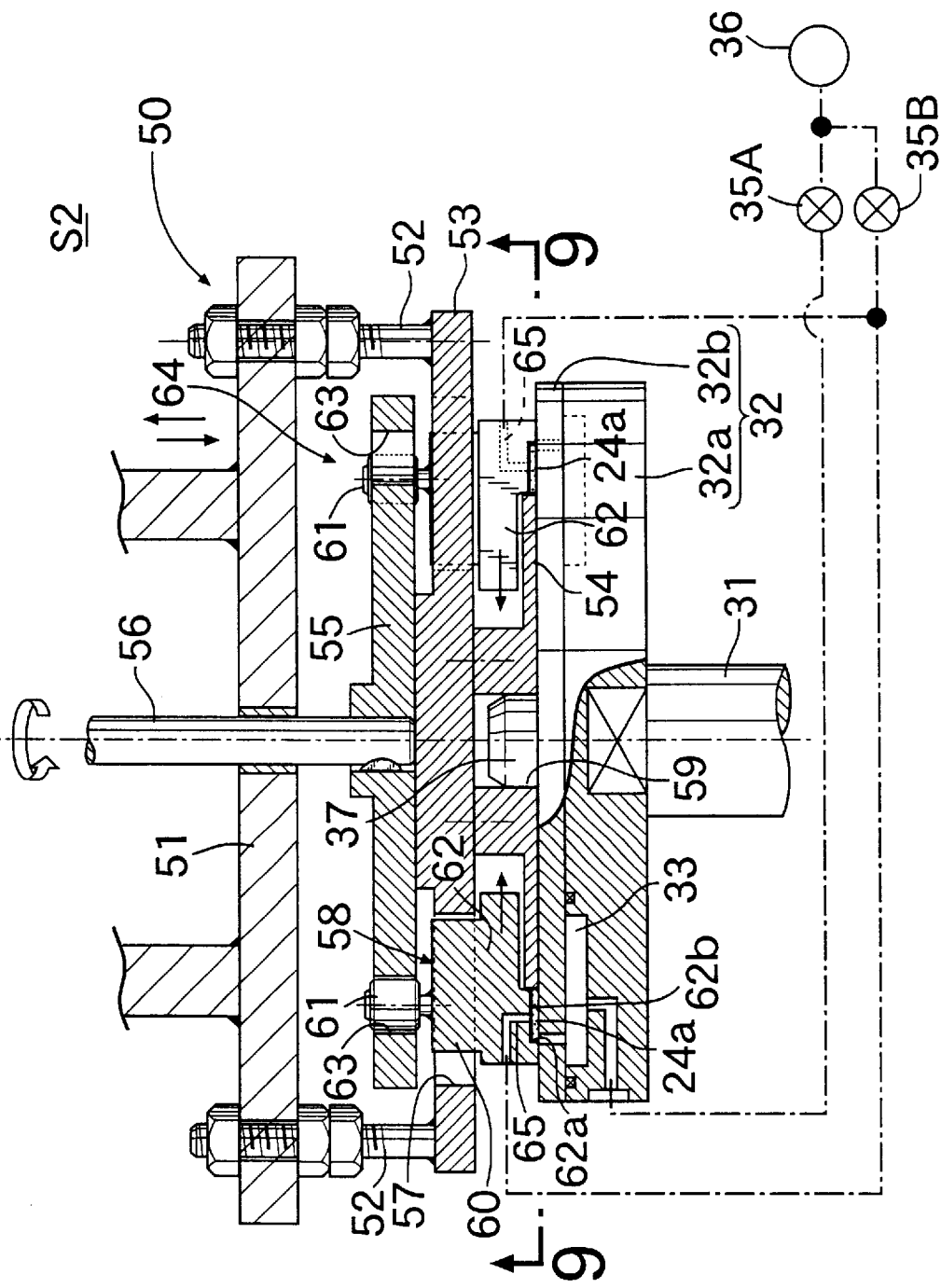
FIG. 8 is a diagram for explaining the action corresponding to FIG. 5.
Figure 9:
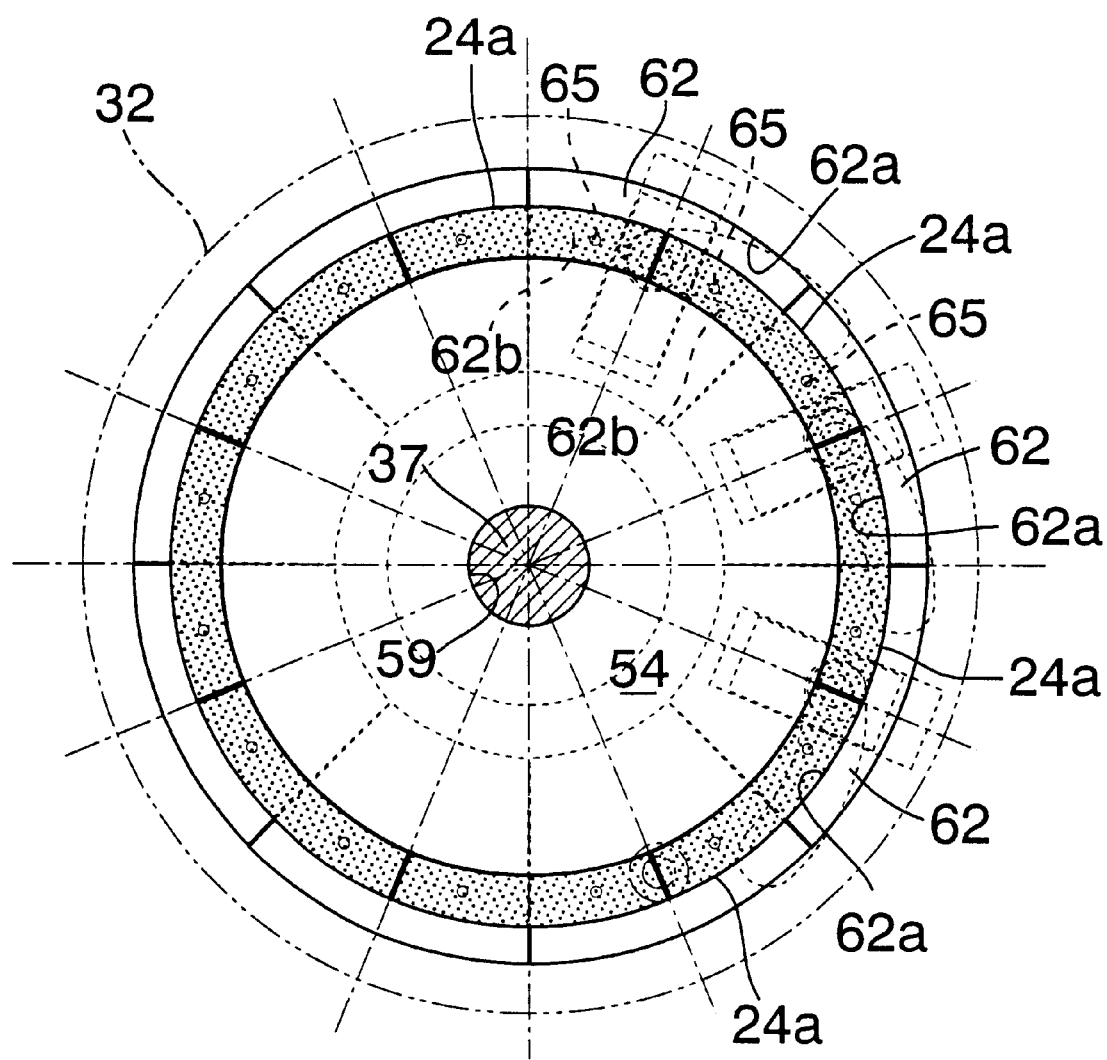
FIG. 9 is a cross-section at line 9–9 in FIG. 8.

Each of the arrangement correction members 58 comprises a guide 60 fitted in the guide hole 57, a roller 61 supported on a shaft on top of the guide 60, and a sector-shaped correction claw 62 connected to the undersurface of the guide 60. Each of the rollers 61 engages with a cam groove 63 formed in the cam plate 55. Each of the cam grooves 63 is inclined with a fixed angle relative to a straight line which runs, in parallel with a tangent of the cam plate 55, through the centre of rotation of each of the rollers 61. By reciprocating the cam plate 55 through a predetermined angle, all of the arrangement correction members 58 are made to slide synchronously via each of the rollers 61 along their respective guide holes 57 between a radially outer open position (FIGS. 5 to 7) and a radially inner closed position (FIGS. 8 and 9). The cam plate 55, the rollers 61 and the guide holes 57 thus form a cam mechanism 64 for operating the plurality of the arrangement correction members 58.

A projecting wall 62a and an attachment surface 62b adjoining the radially inner end of the projecting wall 62a are formed on the undersurface of the correction claws 62. The projecting wall 62a is positioned so as to face the outer periphery of the core 54.

Each of the correction claws 62 has a plurality of vacuum holes 65 opening onto the attachment surface 62b. Each of the vacuum holes 65 is connected to the vacuum pump 36 via a second vacuum control valve 35B. When the second vacuum control valve 35B is opened, the vacuum pump 36 supplies a vacuum pressure to the vacuum holes 65. When the second vacuum control valve 35B is closed, the vacuum pressure of the vacuum holes 65 is released.

When the index table 32 is transferred to the lining segment arrangement correction station S2 while a group of the provisionally arranged lining segments 24a are attached thereto by the vacuum pressure, the index table 32 is positioned beneath the lining segment arrangement correction device 50. The lift plate 51 is moved downwards together with the cam plate 55, the device main body 53 and the core 54 in a state in which each of the arrangement correction members 58 is maintained in its open position. The lining segments 24a on the index table 32 are placed in close contact with the attachment surfaces 62b of the correction claws 62 while the positioning projection 37 on the index table 32 is fitted in the positioning hole 59 of the core 54. In this stage, the vacuum pressure of the vacuum chamber 33 of the index table 32 is released by closing the first vacuum control valve 35A so as to release the attachment of each of the lining segments 24a.

Subsequently, by rotating the cam plate 55 so that the arrangement correction members 58 reach the closed positions, all of the correction claws 62 move together in the closing direction, as shown in FIGS. 8 and 9. The respective projecting walls 62a come into contact with the outer periphery of each of the lining segments 24a, thereby moving all of the lining segments 24a towards the core 54. The provisional arrangement of the lining segments 24a is thus corrected into an annular form containing no gaps between any of the lining segments 24a. In this stage, the second vacuum control valve 35B is opened so as to supply the vacuum pressure of the vacuum pump 36 to the vacuum hole 65 of each of the correction claws 62. The correctly arranged lining segments 24a are thereby attached to the attachment surfaces 62b of the respective correction claws 62. The group of correctly arranged lining segments 24a can thus be easily and reliably retained by the arrangement correction members 58, thereby preventing each of the lining segments 24a from displacing.

Figure 10:
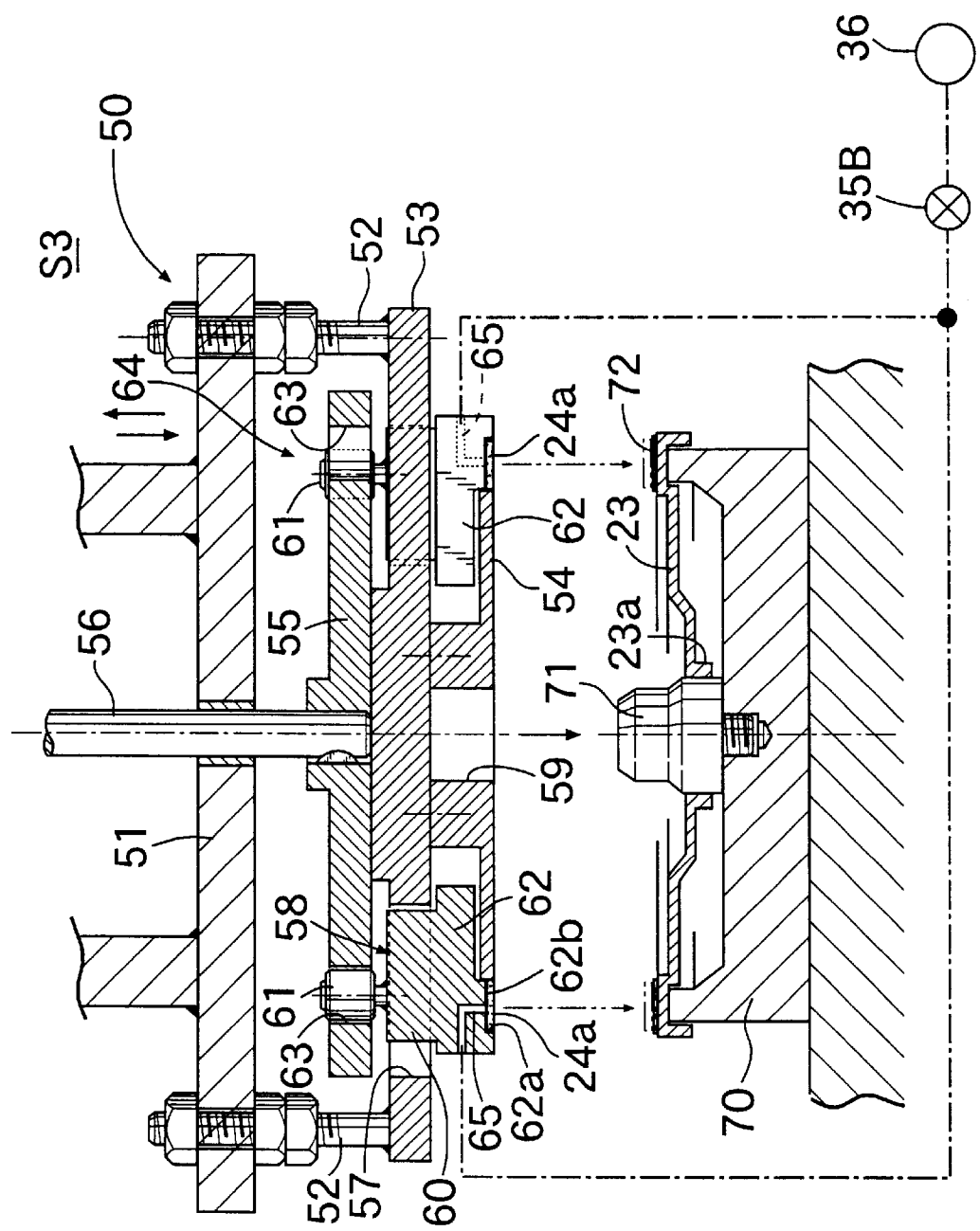
FIG. 10 is a longitudinal section of a lining segment provisional adhesion station.

The lift plate 51 is then lifted and the group of correctly arranged lining segments 24a is transferred to a lining segment provisional adhesion station S3 shown in FIG. 10, together with the arrangement correction members 58. In the lining segment provisional adhesion station S3, the core plate 23 is placed on a receiving platform 70 so that the friction lining adhesion surface faces upwards; a positioning projection 71 formed at the centre of the receiving platform 70 is fitted into the boss 23a of the core plate 23, and an adhesive 72 is coated in an annular form on the friction lining adhesion surface of the core plate 23. The lining segments 24a arranged in an annular form and attached to the arrangement correction members 58 are placed over the above-mentioned adhesive 72 and provisionally adhered, while fitting the positioning projection 71 of the receiving platform 70 into the positioning hole 59 of the core 54, whereby the lining segments 24a are provisionally adhered onto the core plate 23. Subsequently, the second vacuum control valve 35B is closed to release the attachment of each of the lining segments 24a. In this provisional adhesion state, it is possible to check the arrangement of each of the lining segments 24a and re-correct the arrangement, thus improving the quality.

Figure 11:
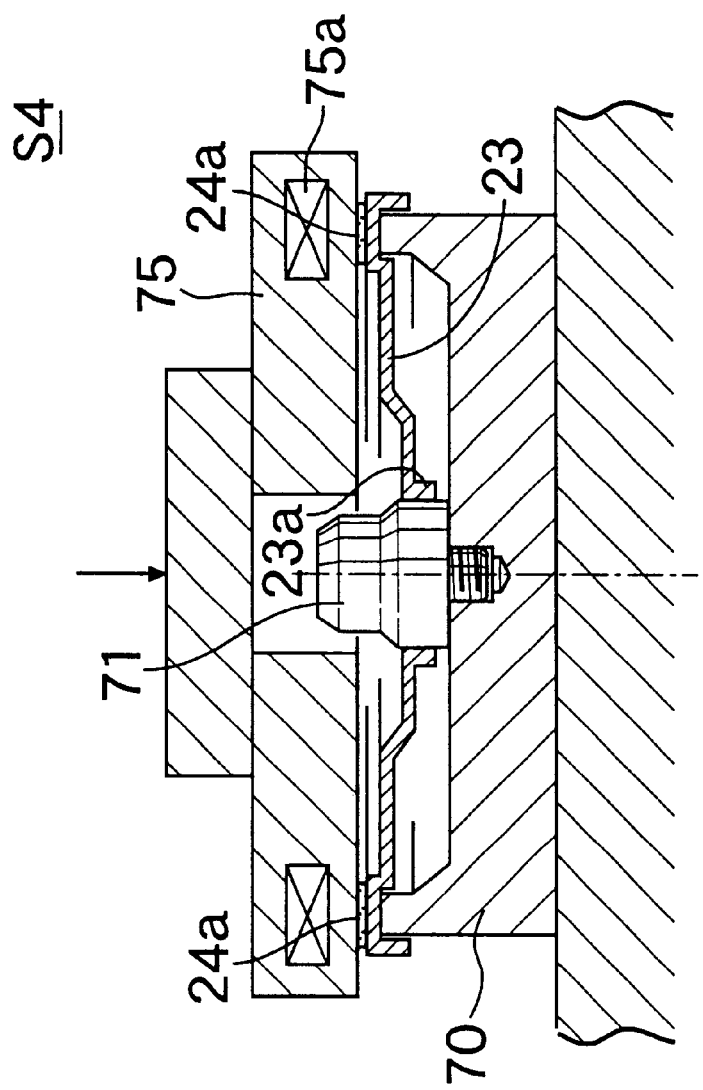
FIG. 11 is a longitudinal section of a lining segment actual adhesion station.

The receiving platform 70 receiving the above-mentioned core plate 23 is then transferred to a lining segment actual adhesion station S4 shown in FIG. 11. The lining segment actual adhesion station S4 includes a compressing/heating plate 75 that is moved vertically by a press machine (not illustrated). The compressing/heating plate 75 has a built-in heater 75a. The press machine presses the compressing/heating plate 75 against the group of lining segments 24a on the core plate 23, thereby actually adhering the group of lining segments 24a to the core plate 23. An annular friction lining 24 is thus formed on the core plate 23, that is, a friction plate F having a flat friction surface as shown in FIG. 2 is completed.

In this stage, since all of the lining segments 24a are compressed by the single compressing/heating plate 75, the ends of adjacent lining segments 24a can be made to contact each other more reliably. Furthermore, the adhesive 72 present between the core plate 23 and the lining segments 24a can diffuse into the gaps between the ends of adjacent lining segments 24a, thus adhering the ends to each other.

Moreover, the planarity of the surface formed by the entire group of lining segments 24a can be effectively improved by compression using the single compressing/heating plate 75.

Since the predetermined operations are carried out in turn at the lining segment provisional arrangement station S1, the lining segment arrangement correction station S2, the lining segment provisional adhesion station S3 and the lining segment actual adhesion station S4, a friction plate F having an annular friction lining 24 including a plurality of sector-shaped lining segments 24a can be produced efficiently, thus enhancing the productivity.

Figure 12:
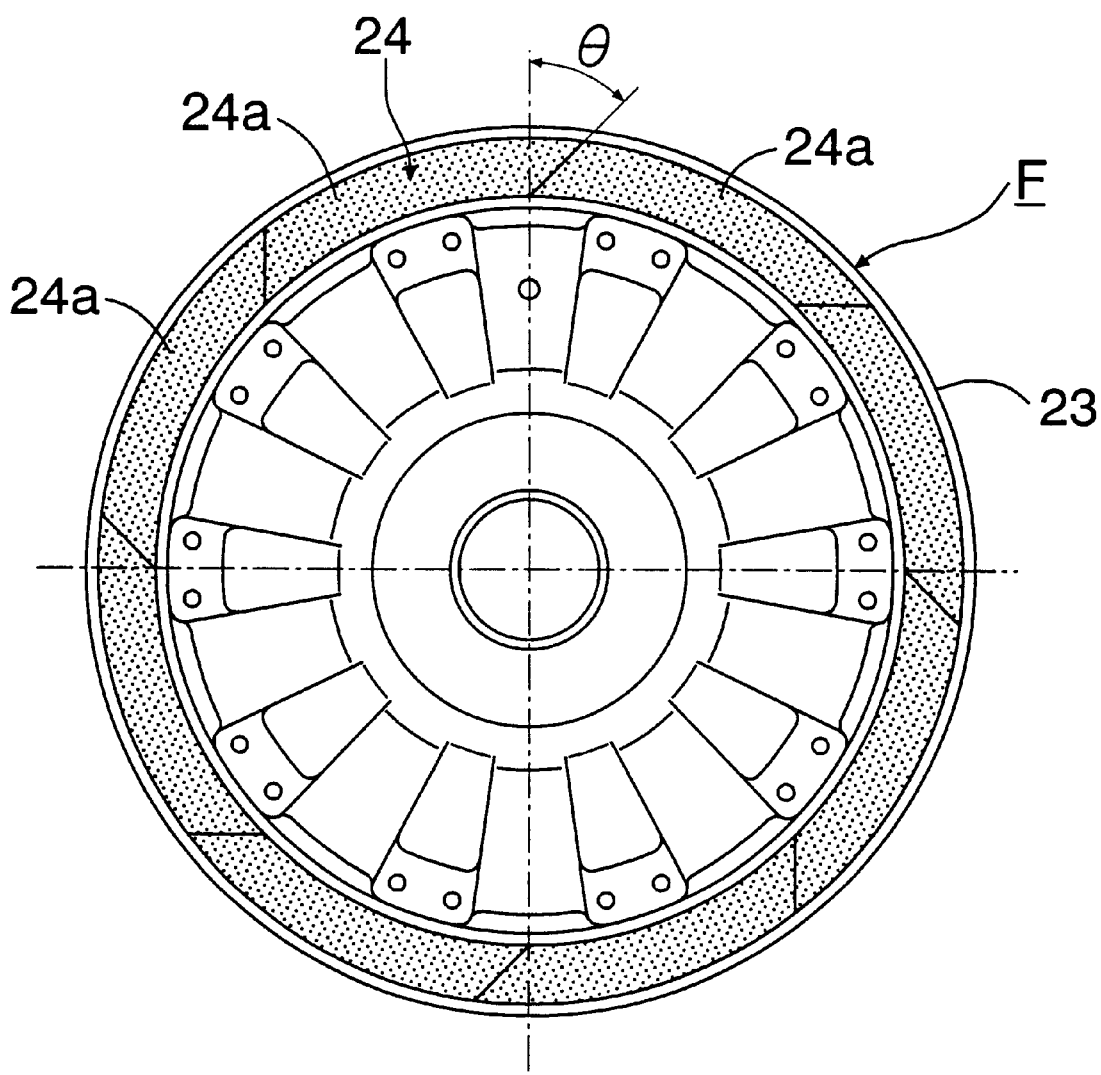
FIG. 12 is a front view of a modified example of lining segments corresponding to FIG. 2.

The present invention is not limited by the above-mentioned embodiment and can be modified in a variety of ways without departing from the sprit and scope of the present invention. For example, each of the sector-shaped lining segments 24a in the above-mentioned embodiment has two edges extending along radiuses, but as shown in FIG. 12, the edge can be formed so as to have a fixed angle θ relative to the radius. Furthermore, the number of lining segments 24a per sheet of the friction plate F can be set at any value according to the size of the friction plate F, etc. Moreover, the use of a friction plate F having a flat friction surface is not limited to lock-up clutches, but the friction plate F can be used in other friction mechanisms.

What is claimed is:

1. A process for producing a friction plate having a flat friction surface by adhering an annular friction lining having a flat friction surface to a side of a core plate, comprising steps of:

provisionally arranging a plurality of substantially sector-shaped lining segments, punched out of a friction lining tape material, in a generally annular form on an index table so as not to overlap with each other;

correcting the provisional arrangement of the lining segments into an annular form having no gaps between the lining segments by moving together the plurality of lining segments, provisionally arranged on the index table, towards the centre of the index table; and adhering the plurality of lining segments, correctly arranged in the annular form, to the side of the core plate.

2. A process for producing a friction plate having a flat friction surface according to claim 1, wherein in the step of provisionally arranging the plurality of lining segments on the index table each of the lining segments punched out of the friction lining tape material is placed in turn on the index table that is rotating.

3. A process for producing a friction plate having a flat friction surface according to claim 1, further comprising steps of:

transferring the group of lining segments correctly arranged on the index table from the index table to the side of the core plate that has been coated with an adhesive and carrying out provisional adhesion; and actually adhering the group of provisionally adhered lining segments to the core plate by compressing/heating.

4. A system for producing a friction plate having a flat friction surface by adhering an annular friction lining having a flat friction surface to a side of a core plate, comprising:

a lining segment provisional arrangement station in which a plurality of substantially sector-shaped lining segments, punched out of a friction lining tape material, are provisionally arranged in a generally annular form on an index table so as not to overlap with each other;

a lining segment arrangement correction station in which the provisional arrangement of the lining segments is corrected into an annular form having no gaps between the lining segments by moving together the plurality of lining segments, provisionally arranged on the index table, towards the centre of the index table by means of a plurality of arrangement correction members provided along the outer peripheries of the lining segments, the group of correctly arranged lining segments being retained by the arrangement correction members;

a lining segment provisional adhesion station in which the group of lining segments retained by the arrangement correction members is placed on the side of the core plate that has been coated with an adhesive, thereby carrying out provisional adhesion; and a lining segment actual adhesion station in which the group of provisionally adhered lining segments is pressed against the core plate by a compressing/heating plate.

5. A system for producing a friction plate having a flat friction surface according to claim 4, wherein the index table of the lining segment provisional arrangement station has a large number of vacuum holes for retaining by vacuum pressure the provisionally arranged lining segments.

6. A system for producing a friction plate having a flat friction surface according to claim 4, wherein the arrangement correction members of the lining segment arrangement correction station have a large number of vacuum holes for retaining the group of correctly arranged lining segments by vacuum pressure.

7. A system for producing a friction plate having a flat friction surface according to claim 4, wherein the lining segment arrangement correction station includes a cam mechanism for synchronously sliding the plurality of arrangement correction members in a radial direction.

* * * * *